United States Patent [19]

Suko

[11] Patent Number: 4,866,586
[45] Date of Patent: Sep. 12, 1989

[54] SHOOT-THROUGH RESISTANT DC/DC POWER CONVERTER

[75] Inventor: Scott K. Suko, Pasadena, Md.

[73] Assignee: Westinghouse Electric Corp., Pittsburgh, Pa.

[21] Appl. No.: 205,766

[22] Filed: Jun. 13, 1988

[51] Int. Cl.[4] ............................................. H02M 3/335
[52] U.S. Cl. .......................................... 363/5; 363/17; 363/56; 363/58
[58] Field of Search .................... 363/17, 56, 132, 136, 363/15, 58

[56] References Cited

U.S. PATENT DOCUMENTS

| | | | |
|---|---|---|---|
| 4,089,049 | 5/1978 | Suzuki et al. | 363/17 |
| 4,135,237 | 1/1979 | Suzuki et al. | 363/132 |
| 4,266,268 | 5/1981 | Tkacenko | 363/49 |
| 4,300,191 | 11/1981 | Baranowski et al. | 363/17 |
| 4,301,496 | 11/1981 | Schwarz | 363/17 |
| 4,408,267 | 10/1983 | Pruitt | 363/17 |
| 4,481,565 | 11/1984 | Colton | 363/56 |
| 4,525,774 | 6/1985 | Kino et al. | 363/17 |
| 4,533,836 | 8/1985 | Carpenter et al. | 307/11 |
| 4,563,731 | 1/1986 | Sato et al. | 363/17 |
| 4,566,059 | 1/1986 | Gallios et al. | 363/17 |

FOREIGN PATENT DOCUMENTS

| | | | |
|---|---|---|---|
| 3049020 | 7/1982 | Fed. Rep. of Germany | 363/17 |
| 194755 | 10/1985 | Japan | 363/15 |
| 1065997 | 1/1984 | U.S.S.R. | 363/17 |
| 1220075 | 3/1986 | U.S.S.R. | |
| 1257778 | 9/1986 | U.S.S.R. | |

OTHER PUBLICATIONS

Regenerative Control for Half Bridge Converter, Benedict et al., IBM Technical Disclosure Bulletin, vol. 23, No. 2, Jul. 1980, pp. 464–465.

Switchmode Converter Topologies-Make Them Work for You, Rudy Severns, Intersil, Inc., Appln. Bulletin A035, Jun. 1980, pp. 1, 13–15, 19 and 30–32.

Primary Examiner—William H. Beha, Jr.
Attorney, Agent, or Firm—W. G. Sutcliff

[57] ABSTRACT

A DC/DC power converter 10 which avoids shoot-through current by employing an energy storage flyback inductor 27 having two separate primary windings 28 and 29, one for current in each direction. The flyback inductor 27 is located inside the switching bridge. In addition, a transformer 30 having two separate windings 42 and 44 is also employed. Thus, shoot-through is avoided and an extra switch for pulse width modulation is not required. In addition, the device does not apply a greater voltage than the line voltage to the switches and "holes" in the output current are not created so that less noise is generated by the device.

6 Claims, 1 Drawing Sheet

SHOOT-THROUGH RESISTANT DC/DC POWER CONVERTER

CROSS-REFERENCE TO RELATED APPLICATION

This application is related to U.S. application entitled "Two Primary Winding Transformer For A Converter Circuit", by A. Hooper, assigned to Westinghouse Electric Corporation having U.S. Ser. No. 187,780, filed Apr. 29, 1988, and incorporated by reference herein.

BACKGROUND OF THE INVENTION

1. Field of the Invention

This invention is directed to a shoot-through resistant DC/DC converter. The present invention avoids destructive shoot-through current when two non-diagonal switches of a bridge accidentally close at the same time. A fly-back inductor is provided with two primary windings, one for current in each direction. The flyback inductor is located inside the switching bridge along with a transformer.

2. Description of the Related Art

Prior art shoot-through resistant DC/DC power converters available on the market can avoid the problem of destructive shoot-through current when two non-diagonal switches accidentally close. However, these converters have problems associated therewith. For example, a bridge variation of a Weinberg converter employs a fly-back inductor outside of the switching bridge. Fly-back refers to a coupled inductor as a secondary output where the current is kept flowing through the inductor by transferring the current from one winding to the other. When switches of the diagonal bridge are closed, energy is stored in the inductor and a transformer acts like a forward converter. When the switches are open, the inductor flies back and transfers the current to the output. As the inductor flies back, the voltage on the primary winding goes to $N_x(V_0+$the diode voltage drop). Since one terminal is tied to the input, the other terminal reaches a voltage considerably higher than the line voltage and the bridge sees the higher voltage. In addition, since the primaries of the transformer and inductor are not connected in series after the switches are opened, there is nothing to force the current in each magnetic element to zero at the same time. Instead, the leakage inductance of the transformer and inductor are absorbed by stray and snubber capacitances. If the primary current of the transformer goes to zero before the primary current of the inductor goes to zero, then the transformer output current will go to zero before the inductor output current has reached its peak value. This creates a short "hole" in the output current and is the cause of excessive output noise in a Weinberg converter. The "hole" occurs because the primaries of the inductor and the transformer are not connected in series after the switches are open.

The Weinberg converter applies a voltage much higher than the line voltage to the switching bridge. This makes it inappropriate for circuits that have high input voltages. Further, this creates excessive noise on the output due to "holes" in the output current during switching, especially since the inductor and transformer are not constrained to act in tandem.

A Calkin-Hamilton power converter requires an inductor on the input side. The inductor on the input side prevents a destructive shoot-through current from developing when two of the non-diagonal switches accidentally close at the same time (i.e., "shoot-through" does not occur because a direct short of the lines through the switches is prevented). That is, the inductor acts as a limiting impedance so that the current ramps up and does not immediately shoot toward infinity and the switches do not burn up. There is a different problem, however, in that the current of the inductor must flow continuously. Thus, instead of using pulse width modulation (PWM), the switches must run at a mutual 50 percent duty cycle, i.e., one diagonal pair of switches is closed and then the other diagonal pair of switches is closed, so that the current always has a flow path. A diode (preferably a high voltage, free-wheeling diode) provides the inductor with the necessary complete current path so that the inductor current can flow continuously. To control this device an additional switch is added to provide pulse width modulation. The additional switch and high voltage free-wheeling diode in the Calkin-Hamilton converter adds losses to the circuit as well as makes the circuit more complex.

Because of the problem of shoot-through currents, a need for DC/DC power converter which has a limiting impedance in series with a primary winding, but does not apply a voltage higher than the input line voltage to the switches, has arisen.

SUMMARY OF THE INVENTION

It is an object of the present invention to provide a new DC/DC power converter topology.

It is another object of the present invention to provide a DC/DC power converter which includes a shoot-through current limiting impedance in the converter and does not apply a voltage higher than the input line voltage to the switches, rather, the switches never see more than the line voltage.

It is yet another object of the present invention to provide a DC/DC power converter in which noise on the output is reduced.

It is still another object of the present invention to provide a DC/DC power converter for pulse width modulation in which an extra switch is not required, simplifying the circuit structure.

The above-mentioned objects of the present invention are attained by providing a DC/DC power converter having two separate primary windings on a flyback type inductor and a transformer both included within a switching bridge and including diodes for each switch around the bridge.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
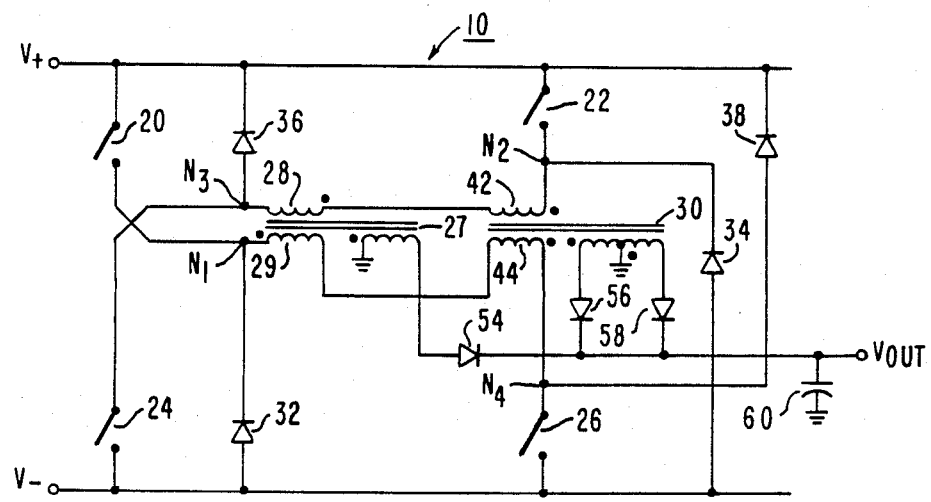
FIG. 1 is a circuit diagram of a full bridge DC/DC power converter according to the present invention.

The present invention will be explained with respect to a full bridge DC/DC power converter 10 as shown in FIG. 1. In FIG. 1, a full bridge 10 employing four switches 20, 22, 24 and 26, is employed. A flyback inductor 27 having two primary windings 28 and 29 is located inside the full bridge as is a transformer 30. In addition, first through fourth diodes 32, 34, 36 and 38 are included as are fifth through seventh diodes 54, 56 and 58. The first through fourth diodes 32-38 can be UES1306's available from UNITRODE and the fifth through seventh diodes 54-58 can be 75HQ040's available from International Rectifier. The switches can be IRF840's available from International Rectifier.

It should be noted that typically the windings of the inductor 27 and transformer 30 have the same turns ratio. In addition, the transformer 30 has typically an ungapped core and the inductor 27 has a typically gapped core for storing energy.

In the converter 10, diagonal switches are opened and closed in tandem, i.e., the first switch 20 and the fourth switch 26 are opened simultaneously, and a short time later the second switch 22 and the third switch 24 are closed. The second switch 22 and the third switch 24 are then opened and another period of time passes in which all four switches (20–26) are open. Then, the first switch 20 and the fourth switch 26 are closed simultaneously. When, for example, the first switch 20 and the fourth switch 26 are closed, the transformer 30 acts like a forward converter supplying current to a load while energy is stored in the inductor 27. When the switches are then opened, leakage inductance causes corresponding clamp diodes (32 and 32) to turn ON. As the line voltage absorbs the energy in the leakage inductances, the primary current drops to zero. When that happens, the secondary current in the transformer 30 drops to zero and the current out of the secondary winding of the inductor 27 rises to the load current value. While the switches remain open, the fly-back inductor 27 delivers current to the load and the transformer does nothing. Since the fly-back inductor 27 is not directly connected to a high voltage power supply (a positive power supply) V+, the switches do not see the primary side fly-back voltage added to the line voltage as would, for example, a Weinberg converter, or other prior art converters. The output voltage is regulated by a pulse width modulation of the diagonal pairs of switches as in a conventional bridge converter.

When non-diagonal switches are closed (which is a non-normal operation condition), for example, the first switch 20 and the third switch 24, or three switches are closed, or all four switches are closed, in standard prior art bridge converters, shoot-through would occur, thus damaging the various elements in the device and making the converter inoperative. In addition, if non-diagonal switches or three or four switches are closed, the switches will literally short the line creating the unlimited shoot-through current as mentioned above.

In FIG. 1, however, when non-diagonal switches are closed, or three or four of the switches are closed, the inductor 27 is in series with all the primary current paths. Thus, the inductor 27 just gains energy and a large shoot-through current does not develop. This occurs because when the switches 20–26 are open and the fly-back inductor 27 is delivering current to the load, the current of the inductor 27 is not added to the line voltage, as happens in Weinberg type converters. Therefore, the switches do not see a voltage higher than the line voltage, thereby preventing shoot-through.

In addition, noise at the output due to holes in the current is greatly reduced. This occurs because the switches 20-26 are not located between the primary windings 42 and 44 of the transformer 30 and the primary windings 20 and 29 of the inductor 27. Therefore, the primary currents of the transformer 30 and the inductor 27 (which are both magnetic elements) are constrained to act in tandem. That is, as the primary current of the transformer 30 dies out (during switch turn off), the primary current of the inductor 27 dies out at the same rate since the secondary current of the transformer 30 and inductor 27 are reflections of the primary circuits, the current in, for example, the transformer 30 will rise at the same rate the current, for example, in the inductor 27, decays, and vice versa. This ensures a smooth transition of output current from the transformer 30 to the inductor 27, thereby reducing noise glitches in the output.

The transformer 30 in the full bridge converter 10 requires the type of transformer set forth in the U.S. patent application mentioned in the Cross-Reference section and incorporated by reference herein. This transformer has two separate primary windings 42 and 44 for each pair of switches so that each diagonal switch is connected to a primary winding. The fly-back inductor 27 also has two separate primary windings 28 and 29. This allows the fly-back inductor 27 to be placed inside the bridge to avoid shoot-through since the inductor 27 is in series with the switches. If two non-diagonal switches are accidentally turned on at the same time shoot-through and destruction of the switches is avoided.

The first through fourth switches 20 through 26, respectively, in FIG. 1, can be conventional power MOS transistors or power bipolar transistors, depending on the application of the device. The four diodes 32, 34, 36 and 38 are not required for proper operation but are useful to protect the switches respectively connected thereto from voltage spikes generated during switching from energy trapped as leakage inductances. These diodes are typically high voltage fast recovery diodes such as 13606s available from Unitrode. The output diodes 54, 56 and 58 are typically low voltage Schottky barrier diodes due to their high efficiency and are, for example, 75HQ040 available from International Rectifier. The output capacitor 60 is a typical output capacitor for a DC/DC converter and can be, for example, a SM015C110KAN capacitor available from AVX. The capacitor 60 has a very large value so that its voltage remains essentially fixed during a switching cycle.

Figure 2:
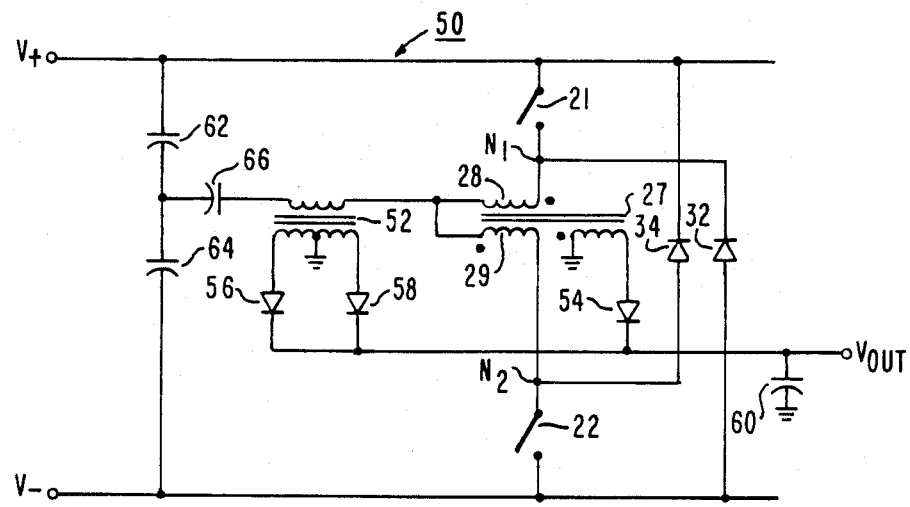
FIG. 2 is a circuit diagram of a half-bridge DC/DC power converter according to the present invention.

FIG. 2 is a half bridge DC/DC power converter 50 according to the present invention. The converter 50 requires only the first switch 20 and second switch 22 and the first and second diodes 32 and 34, respectively. The fly-back inductor 27 is the same as that employed in FIG. 1. The circuit remains substantially the same as that shown in FIG. 1, except for the transformer 52 which is a single primary winding transformer and capacitors 62, 64 and 66 which are connected to the transformer 52, and are standard high frequency, high voltage capacitors. The capacitors 62 and 64 can be, for example, SM032C126MAN capacitors available from AVX, and the capacitor 66 can be, for example, SM052C165MAN capacitors available from AVX. The full bridge converter 10 in FIG. 1 requires the two winding primary transformer 30 to avoid reverse biasing one of the switches when the inductor voltage is greater than the transformer voltage. The half bridge converter 50 can employ the two winding primary transformer 30 in FIG. 1, and the operation of the device will not be drastically changed. The half bridge converter 50 is employed when less power is necessary. This also avoids the prior art shoot-through problem and the switches 20 and 22 do not see the fly-back voltage added to the line voltage because of the connection with the inductor 27 within the half-bridge. At most they see the line voltage.

The present invention provides a new topology for a DC/DC power converter that avoids shoot-through currents, but does not have the draw backs of prior art converters that also avoid shoot-through currents. An energy storing fly-back inductor 27 having two separate primary windings 28 and 29, one for current in each direction, is employed. This allows the fly-back inductor 27 to be located inside the switching bridge 10.

The advantages of the present invention include a more simple circuit since an extra switch for pulse width modulation is not required. In addition, a voltage greater than the line voltage is not applied to the switches, and "holes" in the output current are avoided, lessening output noise. In addition, since the inductor is in series with a primary winding, the device can withstand switching overlaps more effectively than can be tolerated by prior art converters which rely on leakage inductance between two primaries to reject shoot-through.

The foregoing is considered as illustrative only of the principles of the invention. Further, since numerous modifications and changes will readily occur to those skilled in the art, it is not desired to limit the invention to the exact construction and application shown and described, and accordingly, all suitable modifications and equivalents may be resorted to, falling within the scope of the invention and the appended claims and their equivalents.

I claim:

1. A DC/DC power converter, comprising:
   a power transformer having two separate primary windings and a secondary winding;
   bridge circuit means, connected to said power transformer, for supplying current to said power transformer;
   an inductor coupled to said power transformer and said bridge circuit, said inductor having two separate primary windings and a fly-back secondary winding, each primary winding carrying current in one direction; and
   diode means, coupled to said power transformer and said inductor, for providing a switching operation.

2. A DC/DC power converter according to claim 1, wherein said bridge means includes:
   a first switch connected between a high voltage power source and a first one of the two primary windings of said inductor forming a first connection node therebetween;
   a second switch connected between the high voltage power source and a first one of the two primary windings of said power transformer, forming a second connection node therebetween;
   a third switch connected between a second one of the two primary windings of said inductor, forming a third connection node therebetween, and a low voltage power source; and
   a fourth switch connected between a second one of said two primary windings of said power transformer, forming a fourth connection node therebetween, and the low voltage power source.

3. A DC/DC power converter according to claim 2, wherein said diode means includes:
   a first diode connected between the first connection node and the low voltage power source;
   a second diode connected between the low voltage power source and the second connection node;
   a third diode connected between the third connection node and the high voltage power source;
   a fourth diode connected between the fourth connection node and the high voltage power source;
   a fifth diode having a first end connected to a secondary winding of said inductor and having a second end connected to a secondary winding of said transformer and an output terminal;
   an output capacitor having a first end connected to said second end of said fifth diode and to the output terminal and having a second end connected to ground;
   a sixth diode having a first end connected to the secondary winding of said transformer and having a second end connected to said first end of said output capacitor; and
   a seventh diode having a first end connected to the secondary winding of said transformer and having a second end connected to said first end of said output capacitor.

4. A DC/DC power converter according to claim 1, wherein the primary windings of said transformer and said inductor are wound in a direction such that each primary in said inductor produces magnetic flux in the same direction, and each primary in said transformer, produces magnetic flux in opposite directions.

5. A DC/DC power converter, comprising:
   a power transformer having two separate primary windings and a secondary winding;
   a fly-back inductor coupled to said power transformer, said inductor having two separate primary windings, each primary winding carrying current in one direction, said power transformer and said inductor having the same turns ratio;
   a bridge circuit, said inductor and said power transformer being coupled internally to said bridge circuit, said bridge circuit including:
      a first switch having a first end connected to a high voltage power source and having a second end connected to a first primary winding of said inductor forming a first connection node therebetween;
      a second switch having a first end connected to the high voltage power source, and having a second end connected to a first primary winding of said transformer, forming a second connection node therebetween;
      a third switch having a first end connected to a second primary winding of said inductor forming a third connection node therebetween, and having a second end connected to a low voltage power source;
      a fourth switch having a first end connected to a second primary winding of said transformer, forming a fourth connection node therebetween, and having a second end connected to the low voltage power source;

a first diode connected between the first connection node and the low voltage power source;
a second diode connected between the second connection node and the low voltage power source;
a third diode connected between the third connection node and the high voltage power source;
a fourth diode connected between the fourth connection node and the high voltage power source;
a fifth diode connected between a secondary winding of said inductor and an output terminal;
an output capacitor having a first end connected between said fifth diode and the output terminal and having a second end connected to ground;
a sixth diode connected between the secondary winding of said transformer and said first end of said output capacitor; and
a seventh diode connected between the secondary winding of said transformer and said first end of said output capacitor.

6. A DC/DC power converter according to claim 5, wherein said two separate primary windings of said power transformer and said fly-back inductor are wound in a direction such that each primary winding in said fly-back inductor produces magnetic flux in the same direction, and each primary in said power transformer produces magnetic flux in opposite directions.

* * * * *